Patented May 3, 1932

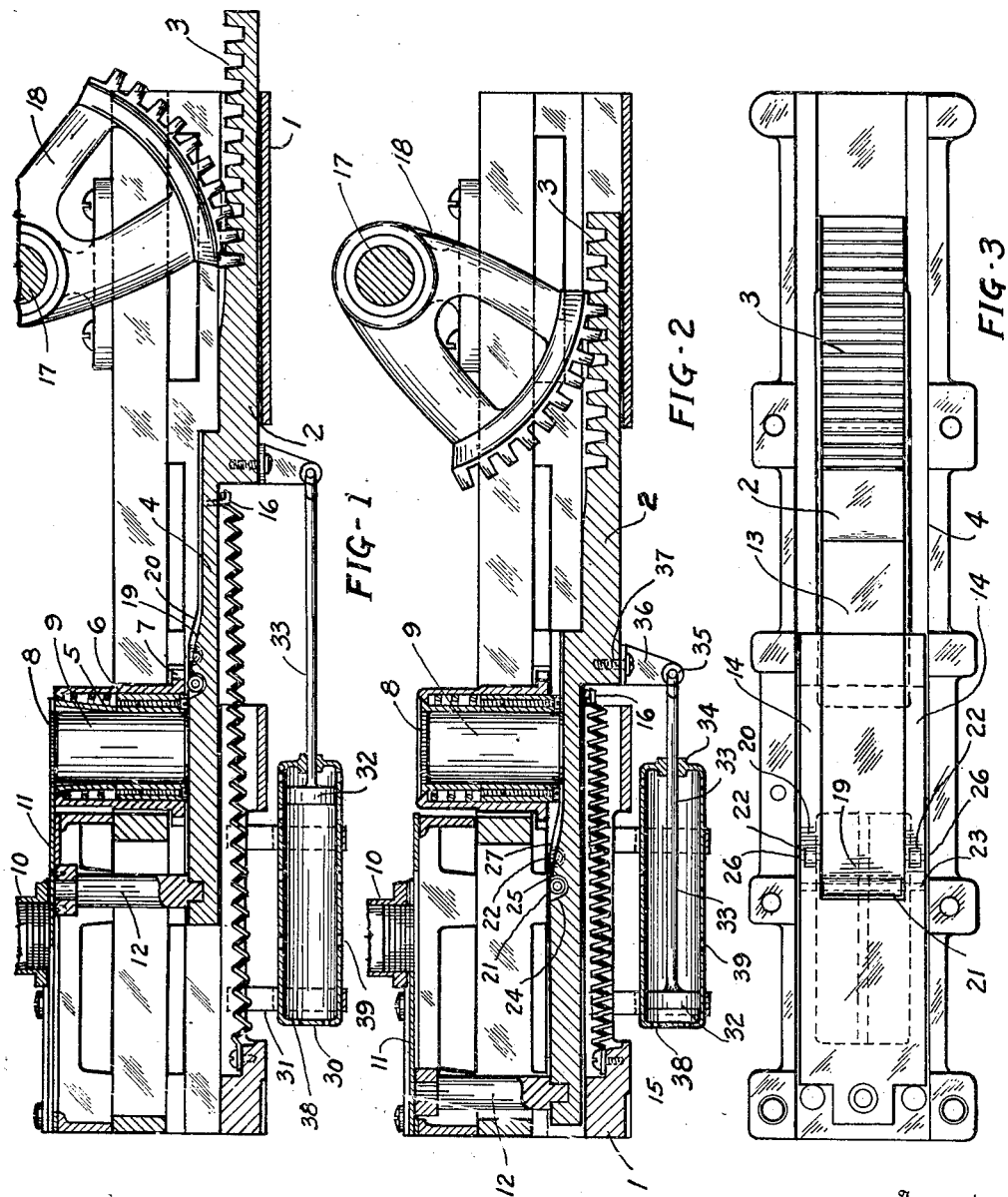

1,856,760

UNITED STATES PATENT OFFICE

GEORGE W. HEENE, OF CLEVELAND, OHIO

EMBOSSING AND VENDING APPARATUS

Application filed October 6, 1930. Serial No. 486,587.

My invention is an improvement in embossing and vending apparatus and relates more particularly to that part of the apparatus which actuates a blank holding chuck and which feeds a new blank to the chuck and discharges the embossed blank.

An object of my invention is to increase the ease of operation of the chuck operating mechanism in one direction and to decelerate the return of the chuck operating mechanism and a blank feeding means to their normal positions.

Another object of my invention is to construct a mechanism of this type which is simple of operation and which minimizes noise in its operation.

Other objects and advantages of my invention will become more apparent as the following description on an embodiment thereof progresses reference being made to the accompanying drawings in which like reference characters are employed to designate like parts throughout the same.

Figure 1 is a longitudinal section through a blank feeding and discharging device, including a chuck for holding the blank during an embossing operation. This view shows some of the parts moved to the right as in opening the chuck, whereby a new blank may be fed to the chuck and the embossed blank discharged into a chute (not shown).

Figure 2 is a view similar to that of Figure 1 except that the parts are returned to their normal position such as that when the blank is being embossed.

Figure 3 is a top plan view of a sliding member for operating the chuck and for feeding a new blank to the chuck.

This invention relates to an embossing and vending apparatus in which metal blanks may be embossed with suitable indicia by operating selectable dies after a tripping mechanism has been released by inserting a coin into the machine. Such an apparatus is shown in my Patent No. 1,494,839 patented May 20, 1924.

In the drawings in which I have illustrated one embodiment of my invention, 1 indicates a portion of the frame of the apparatus in which is mounted a slide 2, one end of which constitutes a rack 3 while another portion 4 constitutes a chuck supporting and operating member. A chuck is indicated generally at 5 and is carried in a shell 6 having an annular series of teeth 7 which are engageable with suitable mechanism for rotating the chuck and shell to bring the blank in proper position under a die for the next impression. The blank is indicated at 8. Slidably mounted in the chuck is a core 9 which is also supported on the slide 4 and is movable relative to the chuck as will be more fully explained hereinafter. The core 9 supports the blank in the chuck and also serves to lift the blank into the path of a new blank when the jaws of the chuck have been opened so that the embossed blank may be discharged into a delivery chute and a new blank fed to the chuck. A magazine 10 is carried by the frame and feeds the blank discs one at a time to the chuck by means of a slide 11 which is secured to the post 12 carried by the member 4. This is clearly illustrated in Figures 1 and 2.

In Figure 2 I have illustrated the various parts at rest in which it will be seen that the blank 8 is securely held by the chuck in position to be embossed by a die (not shown). With the parts in the position shown, the core 9 rests upon the centrally disposed surface 13 of the slide 4 while the chuck body 5 rests upon the tracks 14.

It will also be noted that with the parts in these positions the slide 11 is retracted beneath the magazine 10 so that a new blank is dropped into the opening formed in the feed end of the slide. One or more coil springs 15 are provided to return the slide 4 to the position shown in Figure 2, one end of the springs being secured to the base or frame 1, the other end of the springs being secured to the slide 4 as indicated at 16.

In Figure 1, I have illustrated the slide in its extended position to the right. This position is accomplished by actuating a handle keyed to the shaft 17 which carries the gear segment 18.

It will be noted that the slide 4 is provided with inclined or cam surfaces 19 and 20 which are engaged by the core 9 and the chuck body 5, respectively. In this manner, as the slide is moved beneath the chuck by operating the handle carried by the shaft 17 in one direction, so that the parts are moved to the position shown in Figure 1, the core 9 will travel up the centrally disposed inclined surface 19 as this surface moves beneath the core. Similarly, the chuck body 5 which rests upon the tracks 14 will travel up the inclined surfaces or cams 20 during such movement of the slide 4. It will be noted however that the inclined surfaces 20 of the tracks 14 are engaged by the body 5 of the chuck prior to engagement of the inclined surface 19 with the core 9 during movement of the slide 4 to the position shown in Figure 1. In this manner the chuck body is moved axially upwardly in advance of an axially upward movement of the core 9, thus assuring that the jaws of the chuck will release their grip from the blank 8 just in advance of upward movement of the core 9. As the core 9 moves upwardly in the chuck the blank is raised to the position shown in Figure 1, which is in the path of movement of a new blank which is to be positioned in the chuck. Continued movement of the slide 11 to the right in Figure 1 will cause the new blank to push the finished blank from the chuck and deliver it to a discharge chute (not shown), the new blank being deposited in proper position on the core for lowering into a plane intersecting the chuck jaws.

As the cam surfaces 19 and 20 move to the right from the position shown in Figure 2 and as the bottom surfaces of the core and chuck body travel up these faces respectively, and approach the summits of the inclines, the tendency to bind or stick is eliminated by the free rollers or bearings 21 and 22 respectively.

The roller 21 is illustrated more clearly in Figure 3 and consists preferably of an elongated roller extending transversely of the track 13 and freely rotatable in the slide 4 on a pin 23. It will be noted that the slide 4 is cut away as at 24 to provide a seat for this roller so that the top edge 25 of the inclined wall 19, if extended in the direction of the roller, would be substantially tangent to the outer surface of the roller.

In the same manner, the smaller rollers 22 are mounted in the slide 4, and axes extending transversely of the tracks 14. These rollers are also freely rotatable on pins 26 secured in the slide 4. As shown in Figures 1 and 2 the rollers 22 are seated in a cut away portion of the slide 4 so that the top edge 27 of the inclined walls 20, if extended toward the roller would be substantially tangent to these rollers.

In this manner I have provided means to prevent binding or sticking between the chuck body or core and the inclined walls of the slide 4 especially when these parts approach the summits of the inclined surfaces respectively. It will be seen therefore, that, as the core and chuck body approach the summits of the inclined surfaces and pass thereover, the rollers 21 and 22 will then engage the bottom surfaces of these parts and assure free relative movement between the slide and the core or chuck body as the slide continues in its movement to the right in Figure 1. Likewise upon return of the slide to the position shown in Figure 2 the rollers will materially assist the slide in its movement in that direction because of the rolling contact between them and the core and chuck body.

According to the present invention I have also provided means for decelerating the movement of the slide as it approaches the normal position shown in Figure 2. Since the movement of the slide 4 places the springs 15 under considerable tension when the slide reaches its extreme limit of movement as in Figure 1, the return of the slide to the position in Figure 2 is normally in the nature of a strong thrust, in the absence of means for decelerating the movement of the slide as it approaches its extreme limit of movement in this direction. Furthermore, if the slide is allowed to return quickly and under the full tension of the springs 15, considerable shock is distributed to the other parts of the apparatus and the operation of the parts is noisy. One form of decelerating means I have provided is illustrated in Figures 1 and 2.

This decelerating means includes a cylinder 30 which may be secured to the frame 1 by means of supports 31 at any convenient point in which it will operate. For convenience, I have shown the cylinder mounted beneath the support. Operating in this cylinder is a plunger 32 having a connecting rod 33 which operates in a bearing 34. The free end of the connecting rod is pivotally mounted at 35 to a bracket 26 secured to the slide 4 at 37. The forward end of the cylinder is provided with restricted openings 38 while a number of larger openings 39 is provided at convenient points along the cylinder walls so as to permit quick exhaustion of the air in the cylinder on the connecting rod side of the piston as the piston moves to the right as in Figure 1. By this construction the operation of the slide to the position in Figure 1 will not be interfered with. However, when the slide is released to return to the position shown in Figure 2 and as the piston moves to the left of the position in Figure 2 in the cylinder the air in the cylinder is quickly and partially exhausted until the piston approaches closely to the forward end of the cylinder provided with the restricted openings 38. Since these openings permit only a relatively slow escape of the remaining air in the cylinder the approach of the piston 32 to the forward end wall of the cylinder is retarded and slowed up by an air cushion created between the piston and this wall of the cylinder. Since the compression chamber of the cylinder, defined by the face of the piston and the forward inner walls of the cylinder and the connecting side walls, permits only of a retarded escape of the compressed air therein the return of the piston to the extreme limit of its movement to the left is retarded to such an extent that the slide 4 will not be dashed against the end walls of the frame but will be decelerated in its movement as it aproaches the position shown in Figure 2 and thereby eliminating shock or noise in its operation.

Various changes in the details of construction and arrangement of parts may be made without departing from the spirit of my invention or the scope of the appended claims.

I claim:

1. In an embossing and vending apparatus, a chuck, a blank supporting and ejecting core in the chuck, a slide supporting the core and the chuck, means for operating said slide, said slide having chuck and core engaging tracks, and bearing rollers carried by the slide and arranged so that the chuck and core bearing surfaces of said tracks lie substantially tangent to the bearing surfaces of the rollers.

2. In an embossing and vending apparatus, the combination with a chuck for holding a blank during an embossing operation and a blank supporting and ejecting core operable within the chuck, of a support for said chuck and core slidable therebeneath, and means for sliding said support, said support including a body having chuck and core bearing tracks, terminating at one end in inclined track surfaces, and rollers arranged transversely of the tracks, the bearing surfaces of said rollers being arranged in tangential relation with respect to the said inclined track surfaces.

In testimony whereof, I hereunto affix my signature.

GEORGE W. HEENE.